Feb. 21, 1956
H. E. BALSIGER
2,735,237
SPEED REGULATION FOR CONTROL WHEELS
Filed Feb. 19, 1953
3 Sheets-Sheet 1
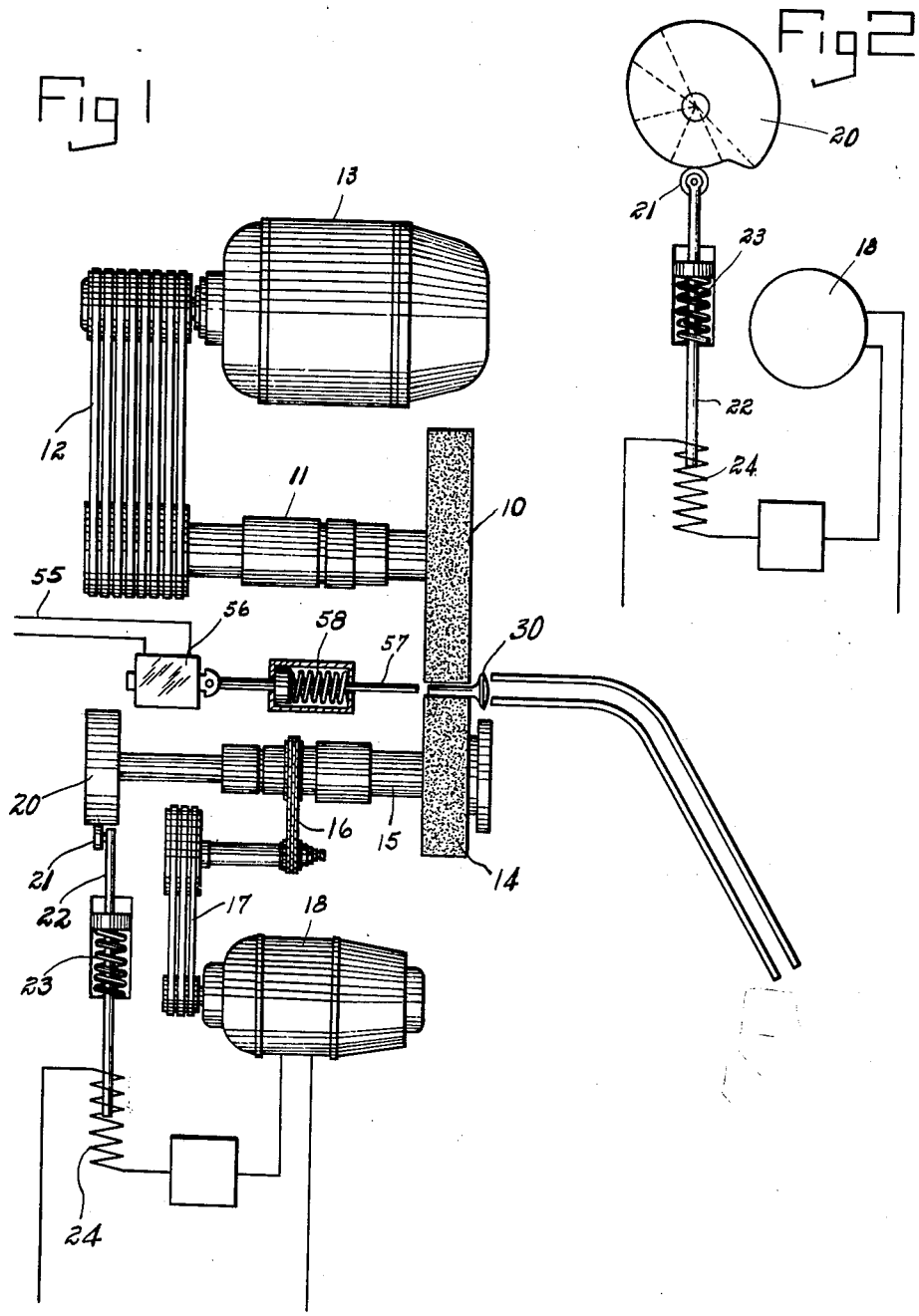
INVENTOR
HAROLD E. BALSIGER
BY
ATTORNEY

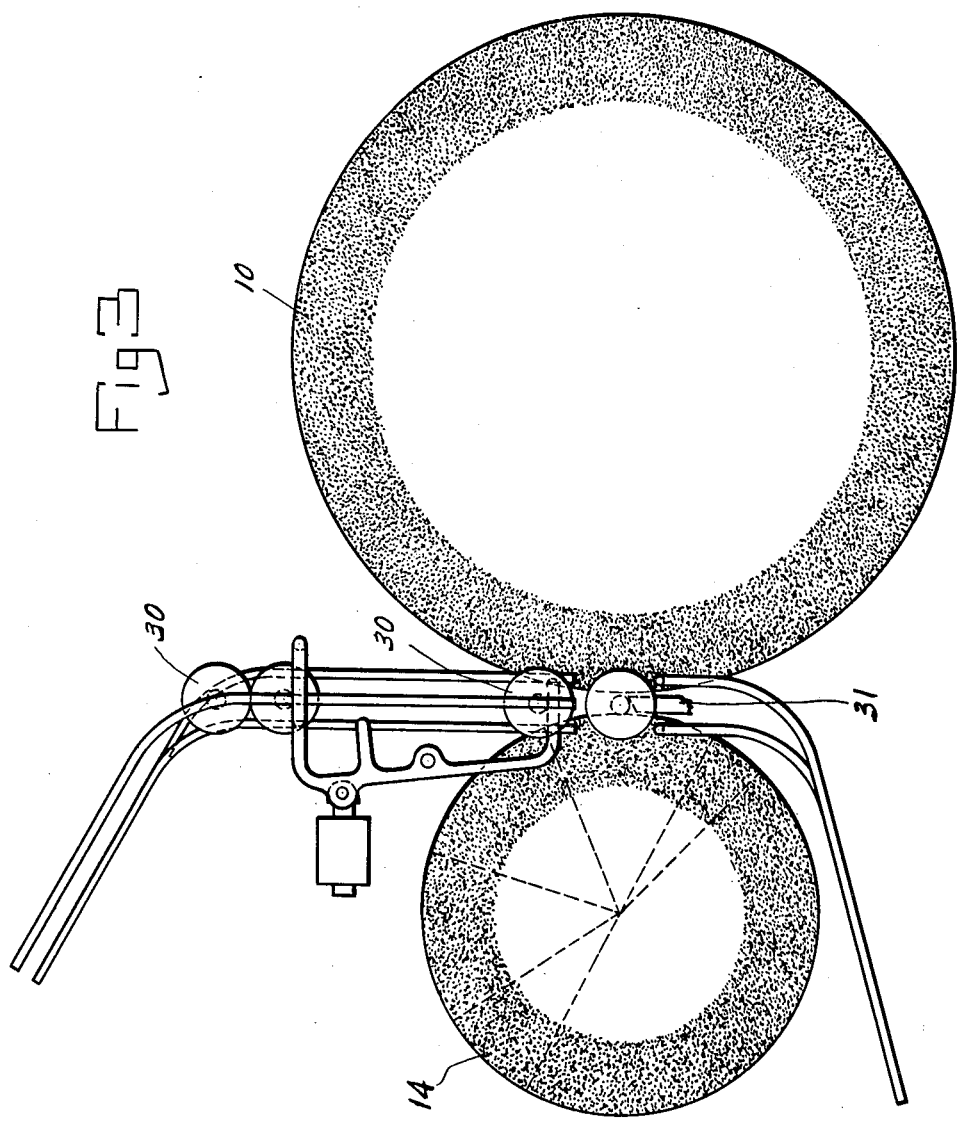

Feb. 21, 1956  H. E. BALSIGER  2,735,237
SPEED REGULATION FOR CONTROL WHEELS
Filed Feb. 19, 1953  3 Sheets-Sheet 3
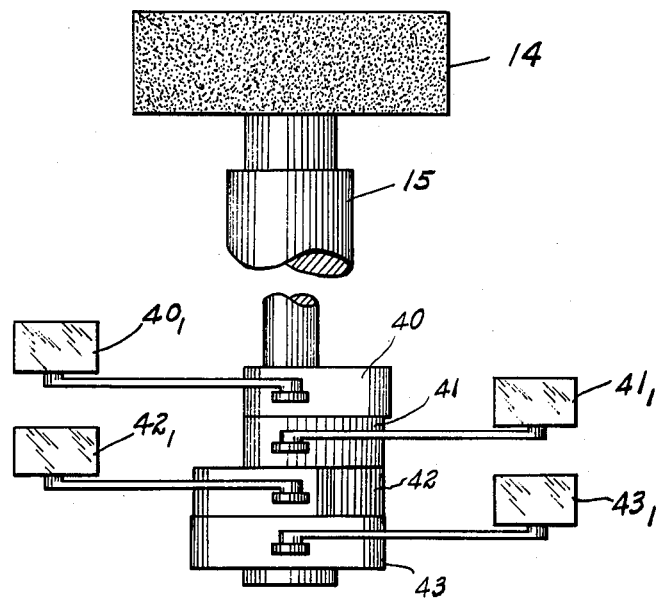
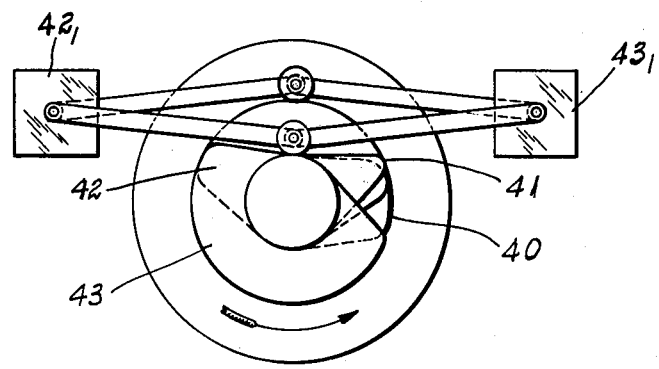
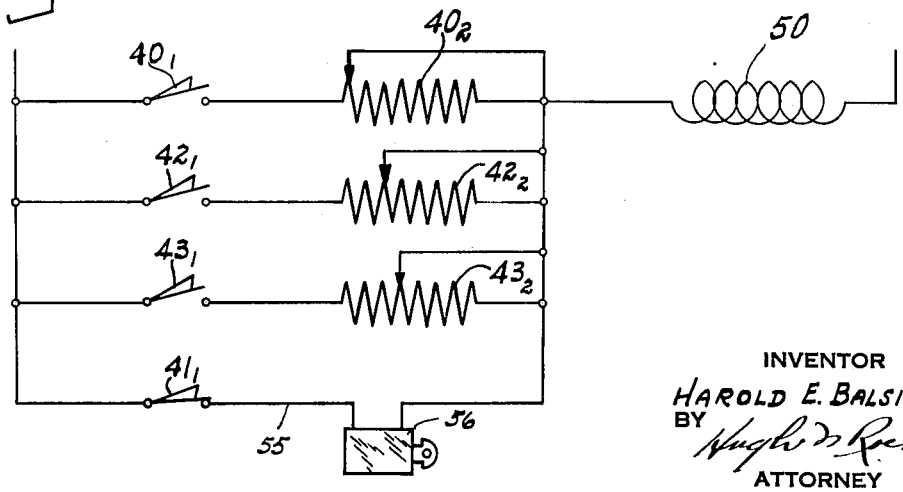
INVENTOR
HAROLD E. BALSIGER
BY
ATTORNEY

United States Patent Office 2,735,237
Patented Feb. 21, 1956

2,735,237

SPEED REGULATION FOR CONTROL WHEELS

Harold E. Balsiger, Waynesboro, Pa., assignor to Landis Tool Company, Waynesboro, Pa.

Application February 19, 1953, Serial No. 337,761

10 Claims. (Cl. 51—103)

This invention relates to centerless grinders of the type having a cam shaped control wheel.

In previous machines of his type the control wheel has been driven at a uniform rate throughout the grinding cycle. This grinding cycle includes ejecting the finished work piece and placing an unground work piece in the machine. During this loading and ejecting portion of the grinding cycle the control wheel rotates through a substantial portion of its peripheral surface. This portion of the control wheel surface cannot be used during the grinding operation and thus the number of turns of a work piece is limited to what can be provided with the remaining surface of the control wheel.

It is therefore an object of this invention to overcome this limitation so that a greater portion of the surface of a control wheel may be utilized during the actual grinding operation.

A further object is to provide means whereby a relatively small portion of the regulating wheel surface will pass through the operating position during the loading and ejecting cycle.

A further object is to provide means for reducing the speed of the control wheel during the loading and ejecting portion of the cycle.

A further object is to provide means for changing the rate of rotation of the control wheel during other portions of the grinding cycle.

A further object is to provide means for ejecting a finished work piece at a predetermined point in the rotation of the control wheel.

In the drawings: Fig. 1 is a plan view showing diagrammatically the arrangement of parts of a centerless grinder including a device for regulating the speed of the control wheel;

Fig. 2 shows the shape of the cam for operating the speed regulation device for the control wheel and the relation of said cam and said regulating means;

Fig. 3 is an end elevation of a grinding wheel and a control wheel showing possible division of control wheel for speed regulating purposes;

Fig. 4 is a plan view of a preferred device for regulating the speed of the control wheel;

Fig. 5 is an end elevation of the mechanism shown in Fig. 4; and

Fig. 6 is an electrical diagram of the control wheel motor and speed regulating means.

Numeral 10 indicates a grinding wheel mounted on spindle 11 driven through belts 12 by motor 13. The means for feeding said grinding wheel during a grinding operation is disclosed in Patent 2,419,940—Balsiger—granted May 6, 1947.

Numeral 14 indicates a control wheel mounted on spindle 15 and driven through chain 16 and belts 17 by motor 18.

Cam 20 on spindle 15 is engaged by a roller 21 attached to a plunger 22 and held in engagement with cam 20 by means of spring 23. Plunger 22 serves as an adjustable coil in reactor core 24. The active portion of plunger 22 enters coil 24 and controls the speed of motor 18, and hence of control wheel 14.

Control wheel 14 is non-circular in cross-section at right angles to its axis. Work piece 30 is placed between grinding wheel 10, control wheel 14, and work rest 31. Said work pieces are introduced into the grinding throat while the minimum diameter portion of the control wheel is passing therethrough. Succeeding portions of the control wheel increase in diameter so that the space between the face of the control wheel and that of the grinding wheel becomes smaller and smaller as does the diameter of a work piece between said wheel space. The grinding feed may be provided in this manner or by feeding the grinding wheel as in the above mentioned patent—2,419,940. Since no grinding, but only loading and ejecting is done on the portion of minimum diameter, it is desirable to keep the arc of this portion as short as possible and thus allow a greater portion of the peripheral surface of the control wheel to be used for rotating the work during the grinding portion of the cycle. This is a function of cam 20 and reactor coil 24.

Preferred means for regulating the speed of the control wheel during a single revolution is that shown in Figs. 4, 5, and 6. This means for governing the control wheel speed consists of a series of cams 40, 41, 42, and 43 in axial alignment on spindle 15. All of these cams have the same maximum diameter but vary in the peripheral extent of said maximum diameter. Each of the cams 40, 42, and 43 actuates a limit switch having a corresponding reference numeral i. e., 40, 42, and 43, respectively. The angular arrangement of said cams is such that said switches are actuated separately and successively but never simultaneously. Each of said switches is connected to the field 50 of motor 18 through one of the resistances respectively $40_2$, $42_2$, and $43_2$, which will provide the proper speed of the control wheel during that particular part of its rotation. Each of the above mentioned resistances is adjustable so that a wide range of speed is available for each of the several portions of the control wheel.

Switch $40_1$ closes a circuit through resistance $40_2$ to driving motor 18 at its minimum loading speed. Cam 41 actuates switch $41_1$ to complete a circuit to line 55 to actuate ejector solenoid 56 which is connected to ejector plunger 57 and held in operative position by spring 58. Said cam is preferably positioned to function just before cam 40 acts to slow the control wheel to loading speed. Cams 40 and 41 and associated parts represent my invention in its simplest form, one speed for grinding and another speed for loading and ejecting. An alternate arrangement would include solenoid 56 in a circuit parallel to resistance $40_2$ and actuated by switch $40_1$.

Cams 42 and 43 actuate switches $42_1$ and $43_1$ to control the speed of motor 18 through adjustable resistances $42_2$ and $43_2$ respectively. Cam 42 may be used to initiate a rough grinding speed and cam 43 a finish grinding speed of control wheel 14. Thereafter cams 41 and 40 will function as described above.

I claim:

1. A grinding machine comprising a bed, peripherally opposed grinding and control wheels rotatably mounted thereon and forming a grinding throat therebetween, means for driving said control wheel continuously at varying speeds, said control wheel having a portion of relatively shorter radius to permit the introduction of a workpiece and its ejection when ground, and means for reducing the speed of the driving means of said control wheel while said portion of shorter radius passes thru the point of operation.

2. A grinding machine comprising a bed, peripherally opposed grinding and control wheels rotatably mounted thereon and forming a grinding throat therebetween, means for driving said control wheel continuously at varying speeds, said control wheel having a portion of relatively shorter radius to permit the introduction of a workpiece and its ejection when ground, means for reducing the speed of the driving means of said control wheel while said portion of shorter radius passes thru the point of operation, an ejector and means for actuating same at substantially the same time as said speed reduction begins.

3. A grinding machine comprising a bed, peripherally opposed grinding and conrol wheels rotatably mounted thereon and forming a grinding throat therebetween, an electric motor for rotating said control wheel continuously at varying rates of speed, said control wheel having a portion of relatively shorter radius to permit the introduction of a workpiece and its ejection when ground, and means rotatable with said control wheel and including selective resistances in the motor circuit for reducing the speed of said driving means of said control wheel while said portion of shorter radius passes thru the point of operation, an ejector and means for actuating same at a predetermined time relative to the operation of said speed reducing means.

4. A grinding machine comprising a bed, peripherally opposed grinding and control wheels rotatably mounted thereon for continuous rotation and forming a grinding throat therebetween, said control wheel having a portion of the periphery of relatively shorter radius to permit the introduction and ejection of a work piece, another portion of the periphery formed for a rough grinding operation, and a third portion of the periphery formed for a finish grinding operation, a motor for driving said control wheel, means for adjusting the speed of said motor and cam means rotatable with said control wheel for actuating said adjusting means as each of said portions engages the workpiece.

5. A grinding machine comprising a bed, peripherally opposed grinding and control wheels rotatably mounted thereon for continuous rotation, and forming a grinding throat therebetween, said control wheel having the periphery divided into a plurality of portions varying in length and radius for controlling the rate of rotation of a work piece during successive operations in a grinding cycle, a motor for driving said control wheel continuously and means for changing the rate of rotation thereof as each of said portions engages the work piece.

6. A grinding machine comprising a bed, peripherally opposed grinding and control wheels rotatably mounted thereon for continuous rotation and forming a grinding throat therebetween, said control wheel having a portion of the periphery of relatively shorter radius to permit the introduction and ejection of a work piece, a motor for driving said control wheel means for adjusting the speed of said motor and cam means rotatable with said control wheel for actuating said adjusting means as said portion engages the work piece.

7. A grinding machine comprising a bed, peripherally opposed grinding and control wheels rotatably mounted thereon for continuous rotation, and forming a grinding throat therebetween, said control wheel having the periphery divided into a plurality of portions varying in length and radius for controlling the rate of rotation of a work piece during successive operations in a grinding cycle, a motor for driving said control wheel continuously and means for changing the rate of rotation thereof as each of said portions engages the work piece including a plurality of cams on said control wheel spindle, spaced in accordance with said wheel portions, switches actuated by each of said cams and connections between said switches and said control wheel motor for controlling the speed of said motor to suit the phase of the grinding operation then being performed.

8. A grinding machine comprising a bed, peripherally opposed grinding and control wheels rotatably mounted thereon for continuous rotation, and forming a grinding throat therebetween, said control wheel having the periphery divided into a plurality of portions varying in length and radius for controlling the rate of rotation of a work piece during successive operations in a grinding cycle, a motor for driving said control wheel continuously and means for changing the rate of rotation thereof as each of said portions engages the work piece including a cam rotatable with said control wheel and speed control means actuated by said cam for changing the speed of said motor.

9. A grinding machine comprising a bed, peripherally opposed grinding and control wheels rotatably mounted thereon and forming a grinding throat therebetween, means for continuously rotating each of said wheels, said control wheel having a major portion of the periphery thereof formed for feeding a workpiece against said grinding wheel, and having a relatively shorter portion thereof formed of shorter radius to permit the introduction and ejection of a workpiece, means for performing a complete grinding cycle during one revolution of the control wheel, said control wheel rotating means including an adjustable speed motor, selective speed control means for said motor, means including a cam rotatable with said control wheel and means operated thereby for actuating said speed control means for said control wheel so as to drive said control wheel at grinding speed during the feeding portion of said grinding cycle and for changing the speed of the control wheel rotating means so as to drive said control wheel at a slower speed during the loading portion of said grinding cycle.

10. A grinding machine comprising a bed, peripherally opposed grinding and control wheels rotatably mounted thereon and forming a grinding throat therebetween, means for continuously rotating each of said wheels, said control wheel having a major portion of the periphery thereof formed for feeding a workpiece against said grinding wheel, and having a relatively shorter portion thereof formed of shorter radius to permit the introduction and ejection of a workpiece, means for forming a complete grinding cycle during one revolution of the control wheel, said control wheel rotating means including an adjustable speed motor, selective resistances in the circuit for said motor, a cam rotatable with said control wheel, and a switch operated by said cam for changing from one resistance to another so as to drive said control wheel at grinding speed during the feeding portion of said grinding cycle and for changing the speed of the control wheel rotating means so as to drive said control wheel at a slower speed during the loading portion of said grinding cycle.

References Cited in the file of this patent

UNITED STATES PATENTS

| 2,557,248 | Appel et al. | June 19, 1951 |
| 2,603,916 | Price | July 22, 1952 |

FOREIGN PATENTS

| 644,425 | Great Britain | Oct. 11, 1950 |